United States Patent [19]
Levin et al.

[11] Patent Number: 5,327,790
[45] Date of Patent: Jul. 12, 1994

[54] REACTION SENSING TORQUE ACTUATOR

[75] Inventors: Michael Levin, Franklin Park, N.J.; J. Kenneth Salisbury, Jr., Cambridge, Mass.

[73] Assignee: Massachusetts Institute of Technology, Cambridge, Mass.

[21] Appl. No.: 900,663

[22] Filed: Jun. 19, 1992

[51] Int. Cl.⁵ .................................. G01L 3/02
[52] U.S. Cl. ........................ 73/862.325; 73/862.321
[58] Field of Search ............... 73/862.191, 862.193, 73/862.29, 862.31, 862.325, 862.326, 862.34, 862.321

[56] References Cited

U.S. PATENT DOCUMENTS

| | | | |
|---|---|---|---|
| 4,838,361 | 6/1989 | O'Toole | 73/862.325 |
| 4,890,501 | 1/1990 | Schumacher | 73/862.325 |
| 5,046,371 | 9/1991 | Kronberg | 73/862.337 |

*Primary Examiner*—Richard E. Chilcot, Jr.
*Assistant Examiner*—Elizabeth L. Dougherty
*Attorney, Agent, or Firm*—Dike, Bronstein, Roberts & Cushman

[57] ABSTRACT

A reaction torque actuator has a sensor operatively coupled between a motor housing and an outer housing. A pair of bearings support the motor within the outer housing in a spaced, concentric relationship. The bearings allow a mutual angular displacement of the housing about the axis of rotation of the output shaft of the motor, but they isolate the sensor from the axial and radial moments. A resolver surrounds the shaft at its output end to produce a signal that accurately measures the angular position of the shaft. A controller regulates power to the motor windings as a function of signals from the resolver and the sensor and torque commands. In a preferred form for use in robotics where very accurate force control is desired, the motor: is a brushless D.C. motor, the sensor is of the strain gauge type, and the controller uses high quality amplifiers, sine wave commutation, cable shielding, and filtering to limit the noise generated by electronic switching.

9 Claims, 6 Drawing Sheets

REACTION SENSING TORQUE ACTUATOR

This invention was made with government support under contract number N00014-86-K-0685 awarded by the U.S. Navy. The government has certain rights in this invention.

BACKGROUND OF THE INVENTION

This invention relates generally to force control of mechanical devices. More specifically, it relates to a very accurate, high bandwidth torque actuator with a built-in feedback reaction sensor.

Force control is often important in applications where a machine or robot has a member or members that interact with the external world. These machines include numerically controlled machine tools, mechanical arms and hands that assemble, paint, or handle parts and materials, and teleoperated or autonomous robots that can perform tasks in factories, at the ocean bottom, or in outer space. The world in which the robot or machine acts may be well defined, or unknown. Many robotic tasks in assembly or pick and place manipulation can require a control of the force exerted on an object so as not to damage it or the robotic device. In unknown environments it is important to have excellent force control to sense and react to collisions. Fast reaction requires a high bandwidth. Increasingly the capabilities of robots are becoming limited by the accuracy and bandwidth of the force control.

Force control in robotics falls into one of three categories: passive, active, or a combination of passive and active. Remote Center Compliance devices, as described in a 1977 Ph.D. thesis at M.I.T. by S. H. Drake entitled "Using Compliance In Liew Of Sensing Feedback For Automatic Assembly", are representative of passive control. They use compliance to control and limit forces at the end-effector. In active control, commands to an actuator control the forces exerted by manipulators. Active force control methods include feed-forward control and feedback control. Active feedforward systems are most effective when the environment is known and relatively static. Control of joint torques can be adjusted through servo gains or precomputed torques. The actuator then produces the output torque computed. In general, these systems are imprecise, require large amounts of processing time, and are not well suited to operation in changing, dynamic situations, or situations where the operating environment is not well known.

Force and torque sensors are known to provide feedback control. Typically feedback controls fall into one of four types—damping control, stiffness control, impedance control or hybrid position/force control. Damping control uses an inverse damping matrix of variable velocity feedback gains to transform forces into joint velocity commands. Stiffness control uses proportional gains to produce a linear relationship between position error and commanded force. In impedance control, damping and stiffness matrices are used to convert position, velocity and acceleration errors into actuator commands. In the hybrid arrangement, two control systems operate simultaneously, one to close a position loop and the other to close a force loop.

Placement of the sensors is also important in determining whether the force control will operate well. Studies have demonstrated that placing the force sensor on an end effector necessitates lower gains to avoid instability when the end effector is in contact with a stiff environment. See, for example, "Force Feedback Control Of Fine Manipulator Motions" by D. E. Whitney, in the *Journal of Dynamic Systems, Measurement and Control*, Vol. 99, No. 2, (June 1977), pp. 91–97. Other research has shown that dynamics between a sensor and an actuator add poles to the system that often lead to instabilities. These instabilities were overcome if the sensor and actuator were colocated, or if one closed joint torque loops rather than end point force loops. Studies have also demonstrated a positive effect on bandwidth using joint torque sensors. Direct analog feedback of this type avoids calculations associated with Jacobian transforms needed in other active feedback control systems and thereby decreases the response time. However, colocation will not ordinarily provide a precise measure of the output torque at the end-effector.

Even with feedback and colocation, known arrangements for coupling the sensor into the drive have drawbacks. In one arrangement the sensor is connected in line with a motor output shaft. Slip rings or some other arrangement must connect to the shaft, a transmission member, or the output joint to obtain information as to the torque output. This arrangement interferes with the power and signal transmission. Also the sensor bandwidth is limited by the bandwidth of the transmission, which is typically low, e.g., less than 50 Hz. Torque tables are also known where the actuator is compliantly coupled to the torque table and strain gauges measure the reaction torque as a function of the angular displacement of the actuator in response to the reaction torque. The mass of the actuator limits bandwidth.

U.S. Pat. No. 4,384,493 to Grünbaum discloses a device that measures the output torque of a motor shaft by measuring the reaction torque exhibited by a rotation of the motor housing with respect to a fixed motor mounting flange. Strain gauges measure the torque produced by this rotation through the flexure of a bolt fixed on the motor and engaged at one end in a recess on the mounting flange. While this arrangement overcomes some of the problems with the prior art feedback actuators noted above, it is limited to an arrangement where a flange mounts the motor at one end. It also supports the shaft at one bearing and is therefore susceptible to axial and radial moments applied to the shaft. This arrangement is therefore not capable of extreme accuracy and is limited in its applications.

Whole arm manipulators (WAM's) place extreme demands on the force control system since the manipulator must sense and control forces anywhere along a link precisely, accurately, and rapidly. The WAM described in U.S. Pat. No. 5,046,375 has certain inherent force control advantages. It uses a highly efficient cable transmission that exhibits almost no friction or backlash, is backdrivable, lightweight, and has a high aspect ratio. This combination of advantages has shifted the limits on force accuracy and bandwidth of the system from the transmissions to the actuators driving the transmissions.

In theory, the torque output of an electric motor is linearly related to the current flowing to a motor, and therefore measuring the current should give an accurate measure of the torque. However, this approach does not take into account non-linear effects such as friction, (Coulomb, static, and viscous damping), torque ripple and dynamic effects. These non-linear effects can introduce errors as large as 10%. For high accuracy applications such as WAM, accurate feedback of the actual system output torque is required.

In practice, even with actual feedback from joint sensors, torque ripple, friction, sensor-actuator dynamics and other factors limit closed loop torque accuracy to about 8% of full output. Feedforward ripple compensation can usually reduce this error to about 5%, which is acceptable for many applications, but not for others such as precise contact detection. Low error is important whenever high accuracy or a high dynamic range is required. Dynamic range is defined as the ratio relating maximum output torque to the torque precision. Dynamic range allows a comparison, for example, of small actuators with a highly accurate torque output to actuators exhibiting a wider operating range, but lower accuracy.

Despite the known desirability of good control on the torque output of an actuator in robotics and other applications, no known arrangements provide the high accuracy, large bandwidth, and mounting versatility which is becoming necessary for further advances in many robotics applications such as whole arm manipulation.

It is therefore a principal object of this invention to provide a torque actuator with a very high degree of accuracy and precision and with a high bandwidth.

Another principal object is to provide such a high accuracy, responsive actuator which is compact, lightweight and can be mounted in a system in a wide variety of locations and orientations.

Still another principal object is to provide an actuator with the foregoing advantages which is substantially insensitive to torque ripple, friction, and the dynamics of the system.

Still another advantage is that the actuator can be sealed to allow underwater or space operation while still providing all of the foregoing advantages.

Yet another advantage is that the actuator can circulate a cooling liquid over its windings to allow operation at higher maximum output torques than otherwise attainable.

Another object is to provide a torque actuator with all of these advantages which is easily assembled and uses many standard components, and therefore has a favorable cost of manufacture.

SUMMARY OF THE INVENTION

A torque actuator mounts a motor with a motor housing and an output shaft within an outer housing. A pair of axially spaced bearings support the motor within the outer housing in a spaced relationship, with the housings capable of only a mutual angular displacement about the axis of rotation of the shaft. One bearing is preferably mounted in an output end plate of the outer housing and supports the output shaft of the motor. The other bearing is preferably secured between the housings at the opposite or rear end of the actuator. Torque generated between the motor stator (windings) and the rotor (magnets) produces an output torque on the motor shaft (which is passed on to the load) and an opposite and nearly equal reaction torque between the motor housing and outer housing (which passes through the torque sensor). A torque sensor, preferably a high accuracy sensor using strain gauges, is operatively coupled between the housings at the rear end. The reaction torque produces a relative angular displacement of the housings with respect to one another that is resisted by the sensor, which produces an electrical output signal that corresponds to the sensed torque. The torque thus measured is the actual output torque at the motor, including torque variations due to non-linear effects such as torque ripple and dynamic effects in the system. The measured torque does not reflect bearing friction losses.

The bearings isolate the sensor from axial and radial moments that would otherwise be transmitted from the motor to the sensor. The bandwidth of the actuator depends only on the mass of the motor housing (including the stator and other components assembled to the motor housing) and the compliance of the sensor. Bandwidths of at least 200 Hz to 300 Hz are achievable. Torque errors of less than 0.1% over the full torque range of the motor are also characteristic of reaction torque actuators according to this invention.

In the preferred form, the motor is a brushless D.C. motor with a rotor formed of plural rare earth permanent magnets secured about the motor shaft and a stator formed by three phase windings with no core. The actuator also includes an arrangement for sensing the angular position of the motor shaft. A resolver is preferred. The output signal of the resolver and the sensor are applied to an electronic motor drive, preferably a brushless D.C. motor controller using a high quality pulse width modulated linear amplifier and techniques to suppress electronic switching noise to a level that does not overwhelm the low voltage signal of the sensor. Noise suppression features include sine wave commutation, heavy shielding of the motor and cabling, and filtering.

These and other features and objects will be more readily understood from the following detailed description which should be read in light of the accompanying drawings.

DETAILED DESCRIPTION OF THE PREFERRED EMBODIMENTS

Figure 1:
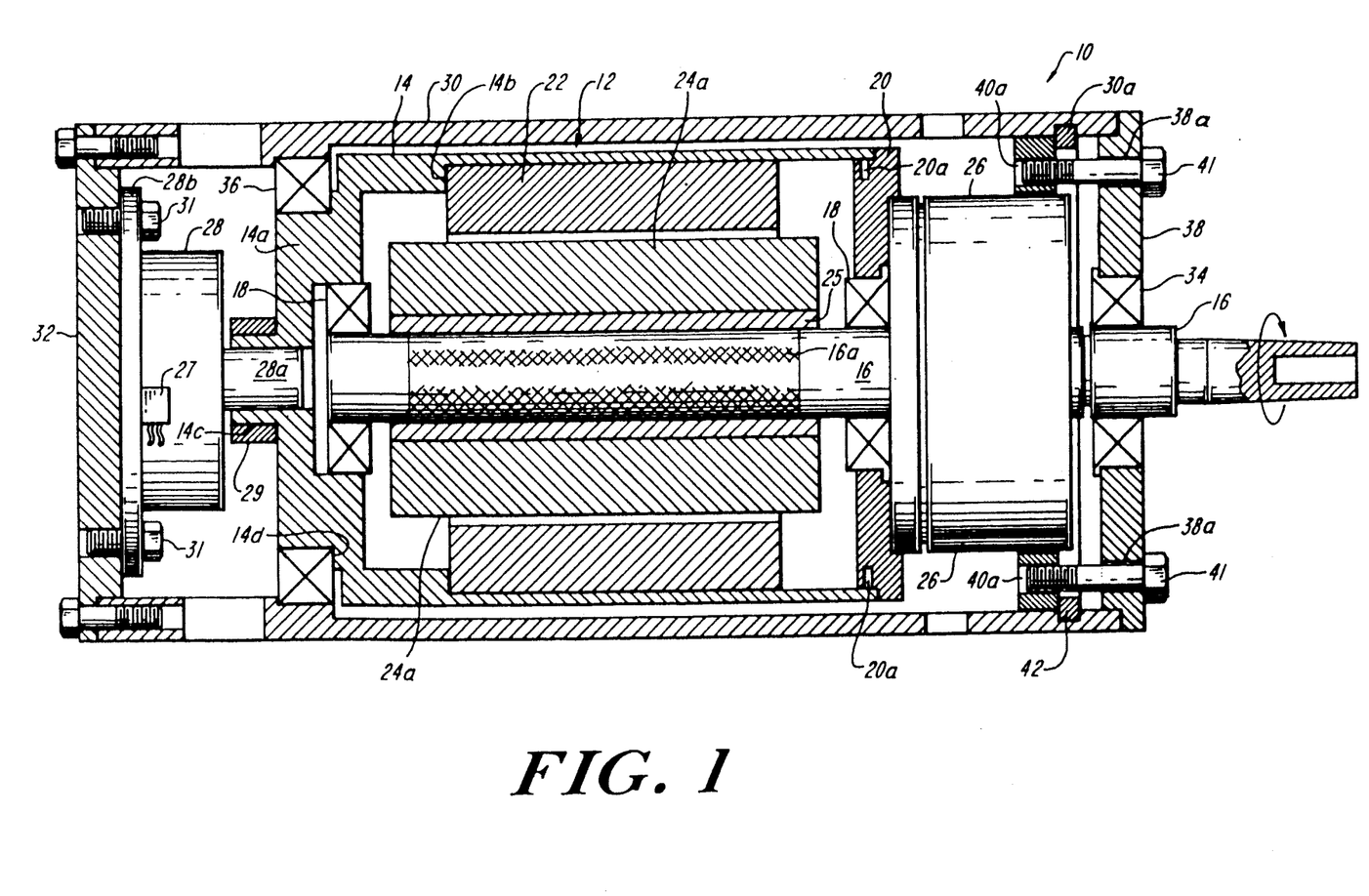
FIG. 1 is a view in vertical section of a reaction torque actuator according to the present invention.
Figure 2:
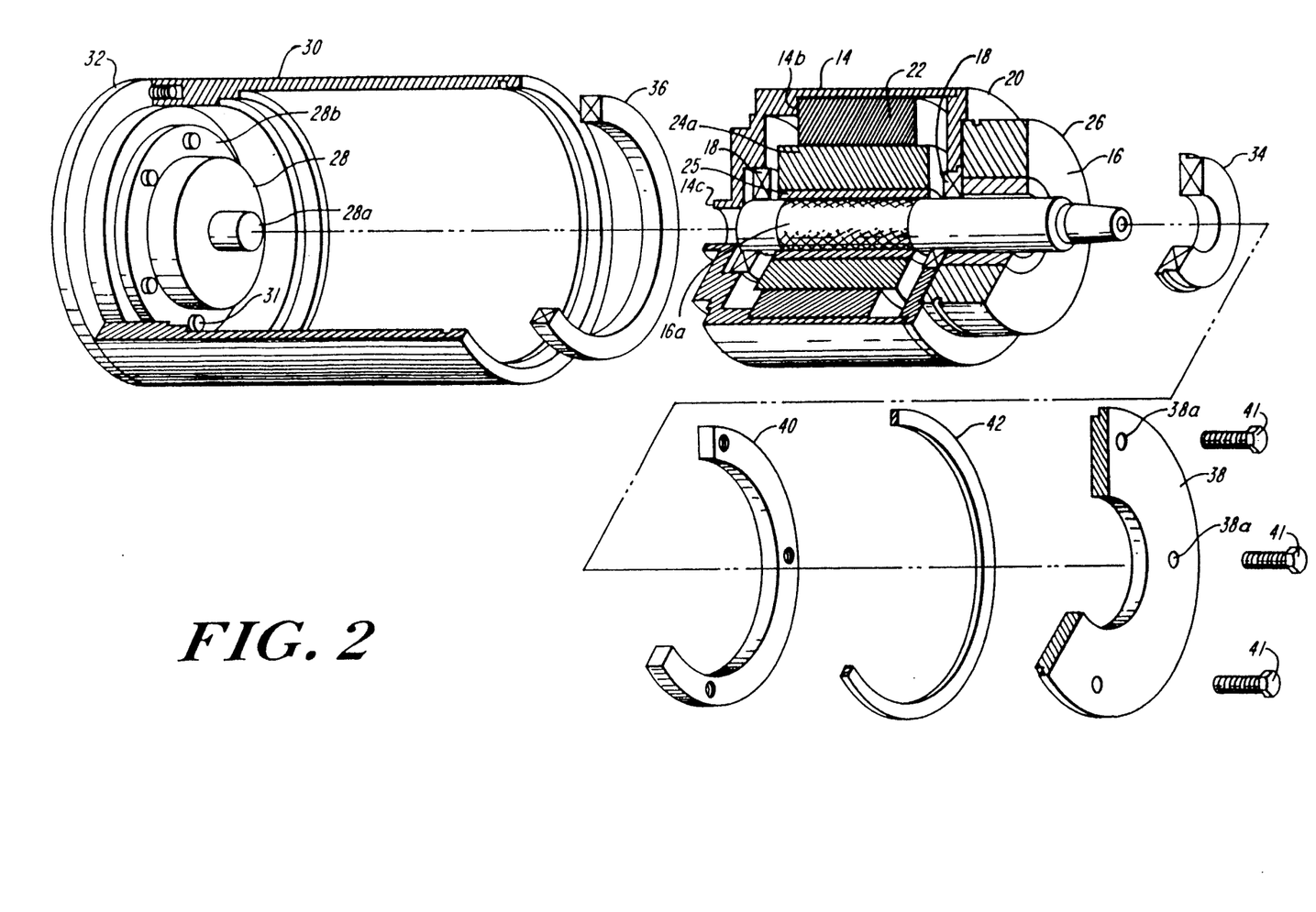
FIG. 2 is an exploded view in perspective of the actuator shown in FIG. 1.

FIGS. 1 and 2 show a reaction torque actuator 10 constructed according to the present invention. It includes a brushless D.C. motor 12 having a motor housing 14 and an output motor shaft 16 centered in the housing. The shaft 16 rotates in motor bearings 18,18 seated in a rear end wall 14a of the motor housing and a resolver plate 20 that covers the front or output end of the motor housing 14. A motor stator 22 is formed by a set of three phase windings adhesively secured to the inner cylindrical wall of the motor housing and abutting an internal shelf 14b. A rotor 24 includes a holder 25 friction fit over a knurled central portion 16a of the motor shaft. A set of permanent magnets 24a, preferably six rare earth magnets in hexagonal array, are secured on the holder. There is a slight air gap between the rotor and the stator. A modular resolver 26 mounts on the front of the resolver plate. The resolver is a two-piece device, like the motor with a rotor and a stator the rotor is secured on the output shaft 16, but has no contact with the stator of the resolver. The resolver 26 provides an electrical signal indicative of the angular position of the shaft with a high degree of resolution.

A principal feature of the present invention is a reaction torque sensor 28 operatively coupled between a motor housing 14 and an outer housing 30 which substantially surrounds the motor housing in a concentric-spaced fashion. An input shaft 28a for the sensor is rigidly secured in a collet 14c formed in the rear wall 14a coaxially with the motor shaft 16. This connection is preferably then secured with a conventional compression clamp 29 to eliminate backlash and to reduce surface stress on the shaft. The sensor includes a mounting plate 28b which is rigidly secured, as with screws 31 as shown or bolts, to a sensor plate 32 that forms a rear end wall of the outer housing 30. In the preferred form illustrated for use in robotics application where extremely high accuracy and a high bandwidth is desired, the sensor is preferably a strain gauge reaction torque transducer of the type sold by Sensotec model QWLC-SM. This sensor is compact and has a torque range of up to 300 in-lbs with a maximum non-linearity of less than 0.1%. Deflection at full load is less than 0.25° of arc.

Another principal feature of the present invention is that an axially spaced pair of bearings 34 and 36 firmly support the output shaft and the motor housing, respectively. They resist the transmission of axial or radial moments from the motor, or its output shaft, to the reaction torque sensor 28. This mounting arrangement also senses and can compensate for non-linear inputs such as the Coulomb and static friction of the motor bearings 18,18, the friction, inertia and response dynamics of the transmission and the load coupled to the transmission. This system is modeled in FIG. 6 and discussed in more detail below.

One result of this mounting arrangement is that the frequency response of the sensor is principally a function of 1) the mass of the motor housing and the stator secured to the motor housing and 2) the compliance of the sensor 28 itself. To some lesser extent the response also reflects the mass of the sensor itself and friction of the bearings 34,36. With this construction, the principal limiting factor on the frequency response of the actuator is the mass of the motor housing and the stator. However, the bandwidth obtainable using this construction is many times greater than obtainable with conventional constructions now in use in robotics.

Turning now to the details of the hardware design of the preferred form of the reaction torque actuator 10 shown in FIGS. 1 and 2, the motor housing is a generally thin wall aluminum "cup" with a maximum outside diameter of approximately 2.6 inches, a length of approximately 3.8 inches, and a minimum wall thickness of about ⅛ inch. The stator 22 is assembled into the housing by applying a coating of thermal grease to the stator and then sliding the stator into the housing until the laminations make contact with the shelf 14b. The resolver plate is then slid onto the open end of the housing. Pins inserted into alignment slots 20a,20a secure the plate against motion relative to the housing. The stator is preferably "slotless", that is, instead of wrapping the coils around an iron core to concentrate the magnetic field, the stator is formed completely by wire windings. This produces a higher flux density despite an air gap that is larger than in conventional motors. The extra space for windings results in larger coils yielding lower copper losses and a higher thermal time constant. The motor inductance is also lower than that of motors containing toothed-type stators. The changing reluctance path of conventional toothed stators produces iron losses and cogging. The varying flux of conventional toothed stators produces hysteresis and eddy current losses which may be the source of more than half of all losses in conventional brushless motors. In the present design cogging is substantially eliminated.

The rotor 24 is preferably formed from six rare earth permanent magnets 24a arranged hexagonally on the stainless steel insert 25. The shaft 16 is knurled to a slightly larger dimension than the inner diameter of the insert to press fit the rotor onto the shaft. This method of attachment assures concentricity and avoids the backlash that can occur when a keyway is used to align and hold the rotor on the shaft. A suitable frameless D.C. torque motor can be obtained from HHK Industries of Lansdale, Pa. Actuator 10 using a motor 12 of this design meets baseline design requirement for a whole arm manipulator 44, that is, a continuous torque of 15 in-lb at a speed of 2500 rpm.

The outer housing 30 is completed by a mounting plate 38 and a retaining plate 40. The retaining plate is slid into the front end of the inner housing after the motor and resolver. The bearing 34 is secured on the output end of the shaft 16, as shown. The mounting plate 38 then encloses the outer housing and engages and supports the bearing 34. The mounting plate is secured with a set of screws 41 which pass through openings 38a and thread into aligned, threaded holes 40a in the retaining plate. A significant advantage of the present invention is that the bearings 34 and 36 can be off the shelf bearings such as those manufactured by Kaydon Corporation of Muskegon, Mich. under the trade designation Reali-Slim. The bearing 36 is press fit onto the back end of the housing 14 seated positively on a flange 14d. Because the housing walls are comparatively thin, they do not permit the mounting plate to be secured using axially directed screws. Therefore the retainer plate 40 is positioned in the housing adjacent an internal circumferential groove 30a which holds a snap ring 42. When screws are inserted into the holes 40a to secure a mounting plate 38, they draw the retaining plate against the snap ring thereby providing a very strong, positive connection between the mounting plate and a cylindrical outer housing wall.

The resolver 26 is secured to the resolver plate at the output end of the motor as shown in FIGS. 1 and 2. The resolver is preferably a high resolution device which accurately determines the angular position of the shaft. The shaft position is required to energize the coils of the motor 12 at the proper times in each cycle of rotation. A resolver is preferably a single speed transmitter type, for example, for the model J55BH-21-K3 produced by Clifton Precision of Clifton Heights, Pa. This is a brushless design which minimizes friction while providing a readout of the angular position of the shaft accurate to within 15 arc minutes. Servo mount cleats (not shown)

preferably attach the resolver to the plate and provide an accurate phase adjustment. Also, precision shaft spacers (not shown) are preferably inserted on both sides of the resolver rotor to position and preload the shaft against the housing bearings 18. While the high accuracy and low friction of this form of resolver is preferred, other angular position transducers are also possible, such as encoders, or even multi-turn potentiometers, but with attendant reductions in accuracy and overall actuator performance.

The sensor 28 produces a very low output voltage, typically in the range of millivolts. To improve torque resolution an instrumentation amplifier and low pass filter assembly is placed in a shielded metal box 27 close to the sensor. A strain gauge signal conditioner such as the one manufactured by Analog Devices under its model 5931B in a 28 pin DIP configuration, contains a suitable amplifier and second order low pass filter with a cutoff frequency that can be adjusted from 10 Hz to 20 kHz. The circuit is compensated by resistors and capacitors to provide the requisite boost in the signal-to-noise ratio for the output of the sensor.

Figure 3:
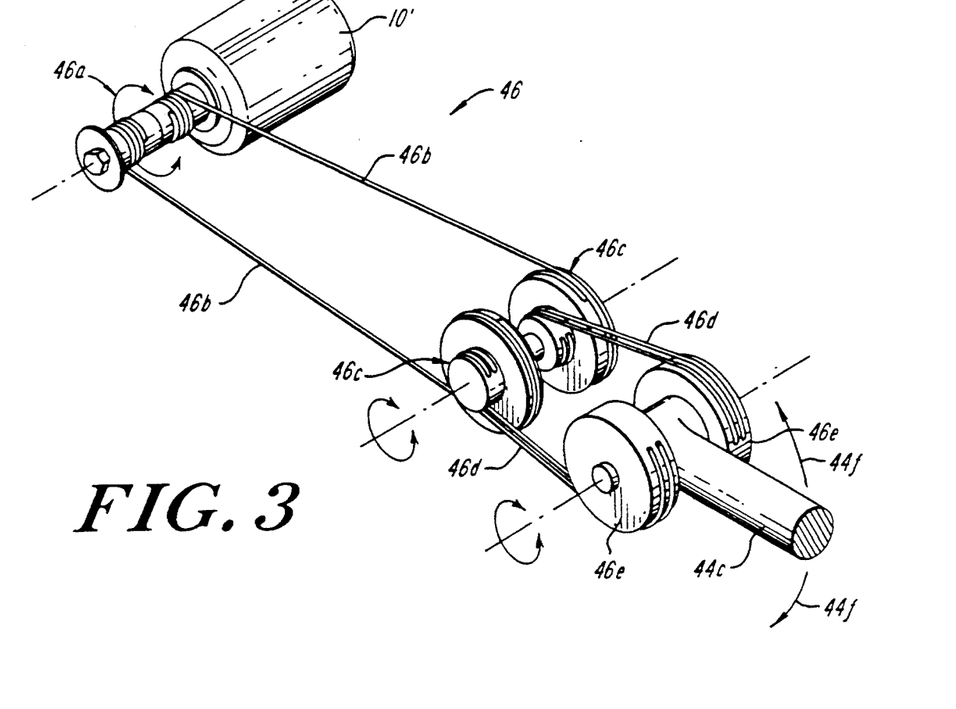
FIG. 3 is a view in perspective of a prior art two stage cable transmission.
Figure 4:
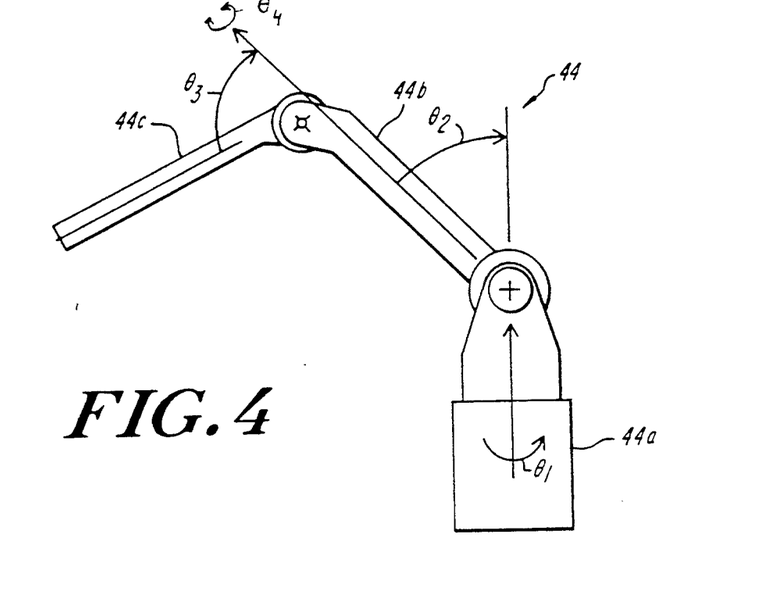
FIG. 4 is a view in side elevation of a prior art whole arm manipulator using the cable transmission of FIG. 3.

The actuator 10 is especially useful in robotic applications where it is necessary to apply or sense forces anywhere along a link arm of a WAM. FIG. 4 shows a simplified view of a WAM 44. It has a base 44a, and a tube that rotates on the base about a first axis through an angle $\theta_1$ as indicated. A second joint allows rotation of a first link arm 44b through an angle $\theta_2$. A second stage link arm 44c pivots about a second joint through an angle $\theta_3$. This entire joint and the attached second stage link arm pivot through an angle $\theta_4$. FIG. 3 shows the actuator 10 of a high efficiency transmission 46. It includes a split spool 46a secured on an output shaft 16' to wind and unwind two runs of a braided steel cable 46b. The cable runs each wrap onto one pulley of a distal reducer 46c. A second stage of the transmission is a short, low speed, high tension section involving additional cables 46d which extend from the smaller diameter pulley of the reducers 46c to a pair of output pulleys 46e where the cables are wound in opposite directions to provide a bi-directional pivotal movement of a link arm, as indicated by directional arrows 44f. Because the inherent efficiency and backdrivability of the cable transmission shown in FIG. 3 and described in detail in the aforementioned U.S.. Pat. No. 5,046,375, disclosure which is incorporated herein by reference, the force accuracy and bandwidth of the actuator become the limiting point for the accuracy and bandwidth of the entire system. The actuator 10 of the present invention increases the accuracy of the applied force from a value of about 5% error to 0.1% error and increases the bandwidth from a range of 10 to 50 Hz to at least 200 Hz, and as much as 300 Hz.

A significant aspect of the present invention is the location and type of the sensor. First, the sensor is employed for reaction sensing, as opposed to in-line sensing, or joint sensing. In in-line sensing, by way of contrast, the sensors are placed between the rotor and the output shaft. The sensor is often a strain type with an instrumented torsion bar that spins with the motor velocity. A slip ring picks up the torque signal off the rotating shaft. Other types of in-line sensors use rotary transformers, torsional variable differential transformers, and phase shift devices. They have lower noise rejection and poorer D.C. response than the strain gauge types.

Because the sensor is located inline with the transmission, its bandwidth is limited by the link natural frequency. Also, the additional compliance of the sensor itself becomes a part of the transmission. But the main problems inherent in using an in-line sensor are the signal noise and friction of the slip ring brushes in the strain gauge system and a lower stiffness as compared to reaction sensors. Also it has increased complexity since the moving shaft must be cleaned and lubricated periodically.

Joint sensing involves a torque sensor placed between the transmission and a given joint. Alternatively, the joint itself can be instrumented if it is compliant enough to be used as a sensor. The bandwidth limitation on this form of sensor is the natural frequency of the transmission path, but the bandwidth is degraded even more than with an inline approach since the sensor compliance is reflected through the system. While this type of sensor provides very accurate measurements of the torque at the joint, it must be mounted directly to the joint. This requires a larger structure and increased masses. Therefore all motors and structures back along the kinematic chain must be sized for this greater mass. Also, all power and signal cables need to run through the links increasing the design complexity and the problem of maintenance. From the point of view of control it is more difficult to achieve stability at high gains. Limit cycling can occur since the transmission dynamics are located between the actuator and the sensor. The bandwidth of this system is limited by the natural frequency of the arm. In very stiff, low inertia mechanisms, the upper frequency bound is on the order of 50 Hz but can fall to as low as 1 or 2 Hz for flexible structures.

Figure 5:
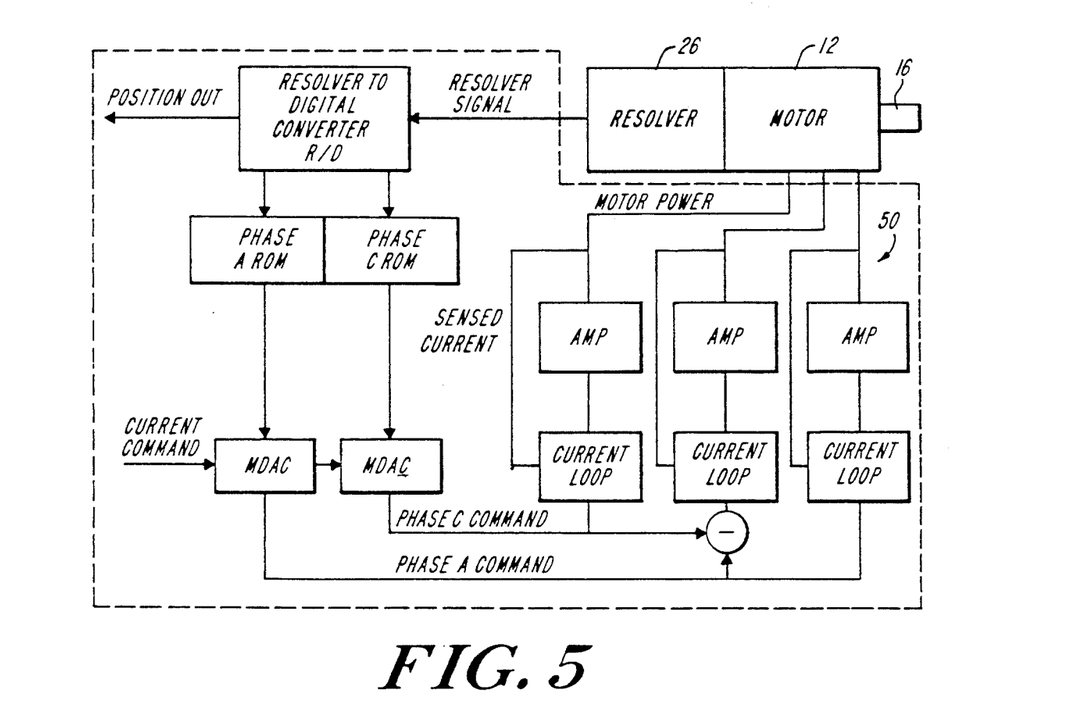
FIG. 5 is a functional block diagram of a controller suitable for use with the actuator shown in FIG. 1.

FIG. 5 illustrates a general model of a robotic system with lumped parameters and using the reaction torque Sensing of the present invention with the sensor located between the actuator and ground.

The simplified equations of motion of this system are:

$$\begin{bmatrix} J_h + J_s & 0 & 0 \\ 0 & J_m & 0 \\ 0 & 0 & J_j \end{bmatrix} \begin{bmatrix} \ddot{\theta}_s \\ \ddot{\theta}_m \\ \ddot{\theta}_j \end{bmatrix} + \begin{bmatrix} 2B_m + B_s & -2B_m & 0 \\ -2B_m & 3B_m & 0 \\ 0 & 0 & B_j \end{bmatrix} \begin{bmatrix} \dot{\theta}_s \\ \dot{\theta}_m \\ \dot{\theta}_j \end{bmatrix} +$$

$$\begin{bmatrix} K_s & 0 & 0 \\ 0 & K_t & -NK_t \\ 0 & -NK_t & N^2 K_t \end{bmatrix} \begin{bmatrix} \theta_s \\ \theta_m \\ \theta_j \end{bmatrix} = \begin{bmatrix} T_m \\ T_m \\ T_j \end{bmatrix}$$

where
$T_m$ = motor torque
$T_j$ = joint output torque
$J_h$ = motor housing inertia
$J_s$ = sensor inertia
$J_m$ = rotor/shaft inertia
$J_j$ = joint/link inertia
$K_s$ = sensor compliance
$K_t$ = transmission compliance
$\theta_s$ = sensor angle of rotation
$\theta_m$ = motor shaft angle of rotation
$\theta_t$ = transmission angle of rotation
$\theta_j$ = joint angle of rotation
$B_s$ = inner housing bearing friction
$B_m$ = shaft bearing friction $B_j$ = joint friction If $B_m$ is much less than 1, the sensed torque $T_s$ is mechanically decoupled from the last link, leaving:

$$T_s = K_s\theta_s = T_m - (J_h+J_s)\ddot{\theta}_s - B_s\dot{\theta}_s$$

The undamped natural frequency between the motor and the sensor is then $$\omega_n^2 = K_s/(J_h+J_s)$$

To find the natural frequency between the motor and the system, it is necessary to reflect the joint inertia and friction into the motor domain. This introduces a factor of $1/N^2$ since all forces are reduced by the ratio N, and $\theta_1 = \theta_t/N$. However, the torque only gets scaled by $1/N$. Replacing this in the simplified equations of motion of the system and removing the decoupled first row:

$$\begin{bmatrix} J_m & 0 \\ 0 & \frac{J_j}{N^2} \end{bmatrix}\begin{bmatrix}\ddot{\theta}_m \\ \ddot{\theta}_t\end{bmatrix} + \begin{bmatrix} B_m & 0 \\ 0 & \frac{B_j}{N^2}\end{bmatrix}\begin{bmatrix}\dot{\theta}_m \\ \dot{\theta}_t\end{bmatrix} +$$

$$\begin{bmatrix} K_t & -K_t \\ -K_t & K_t \end{bmatrix}\begin{bmatrix}\theta_m \\ \theta_t\end{bmatrix} = \begin{bmatrix} T_m \\ T_t \end{bmatrix}$$

To find the undamped natural frequency, take the determinant $K - Jw^2 = 0$, and solve:

$$\omega_n^2 = K_t\left(\frac{1}{J_m} + \frac{N^2}{J_j}\right)$$

Both of these theoretical natural frequencies are much higher than could be achieved using prior art technology. A prototype using the present invention has come close to achieving these theoretical maximum values, thus verifying these calculations and modeling.

A significant advantage of this arrangement is that the sensor is fixed to ground, has no moving parts and the shaft is displaced only a fraction of a degree ($\theta_s$). The sensor is colocated with the motor which provides a stable direct coupling system. The system is also highly stiff proportional to the torque load range. Mounting on the base of a manipulator means that there is a lower mass at the outer links resulting in higher accelerations and forces.

Figure 6:
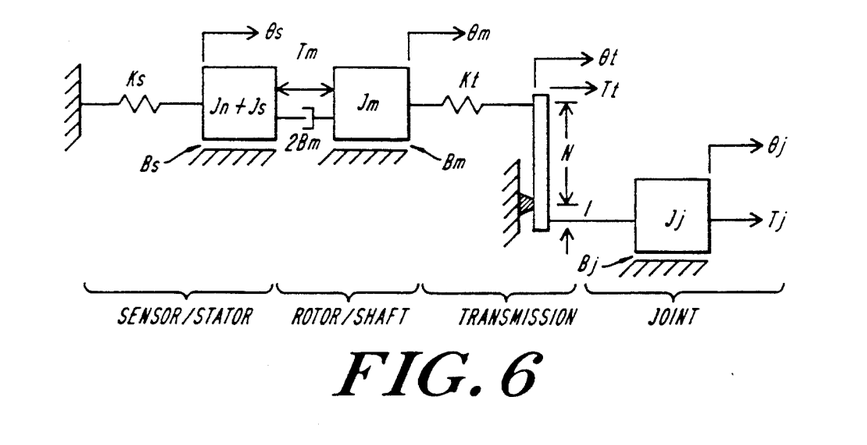
FIG. 6 is a schematic diagram of a lumped parameter model of a robotic system using reaction sensing to control a motor coupled to a load through a transmission and a joint.

The drive electronics for the motor utilize a controller 50 with a functional block diagram as shown in FIG. 6. A key design aspect of the controller is that the amplifier output should be substantially D.C. since any high frequency noise would overwhelm the millivolt signals produced by the strain gauge sensor 28. Electronic switching by pulse width modulation (PWM) causes the amplifiers to radiate voltage spikes at their switching frequency. Typical drivers used heretofore for a WAM system, for example, produce powerful spikes every 0.2 msec at up to 12 volts High power, low noise servo amplifiers based on a PWM design (e.g. ones using low pass filters at the output stage) are not currently commercially available for use with sine wave commutation on a brushless motor. Therefore the present controller controls switching noise by boosting the PWM frequency to 16 KHz, using sine wave commutation, and heavily shielding the motor 12 and cabling and using by-pass capacitors throughout the system. Finally, in the preferred form, standard software filtering provides final noise rejection. With these conditions it is possible to obtain a high power (e.g. three kilowatts) output without overwhelming the millivolt output signals of the sensor. Drive electronics such as .those shown in FIG. 6 are available from Infranor as part of its SMTB series of servo amplifiers for brushless motor control.

Figure 7:
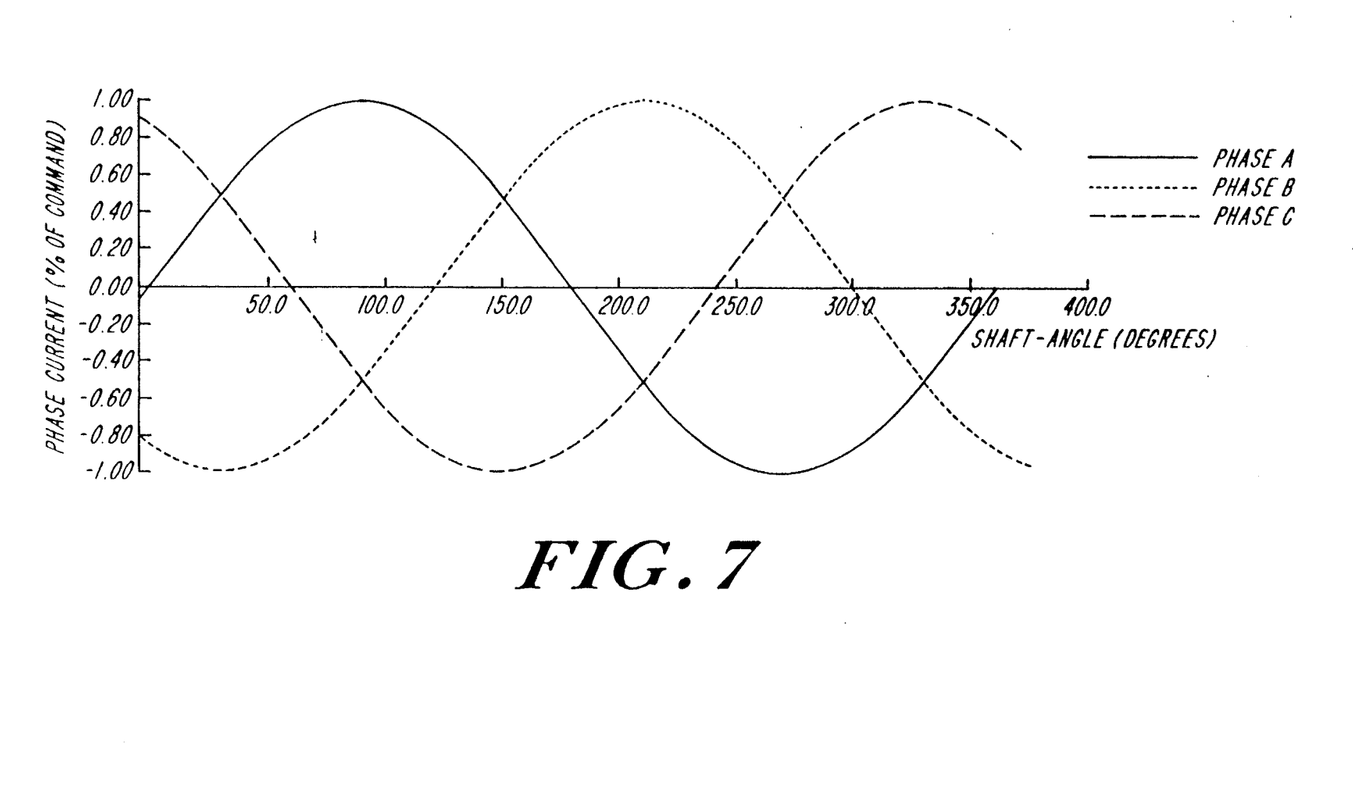
FIG. 7 is a current-phase diagram for a three phase brushless D.C. motor with sine wave commutation of the type shown in FIG. 1.

An internal resolver to digital converter interprets the output of the resolver as a shaft position with a resolution of 12 bits. A sine wave commutation table stored in the phase A and phase C ROM's translates this position to the correct current for each phase as shown in FIG. 7. A current loop 50c is closed around each phase to improve the torque accuracy. The analog input range extends to ±10 volts with full scale producing 10 in-lb of torque.

Figure 8A:
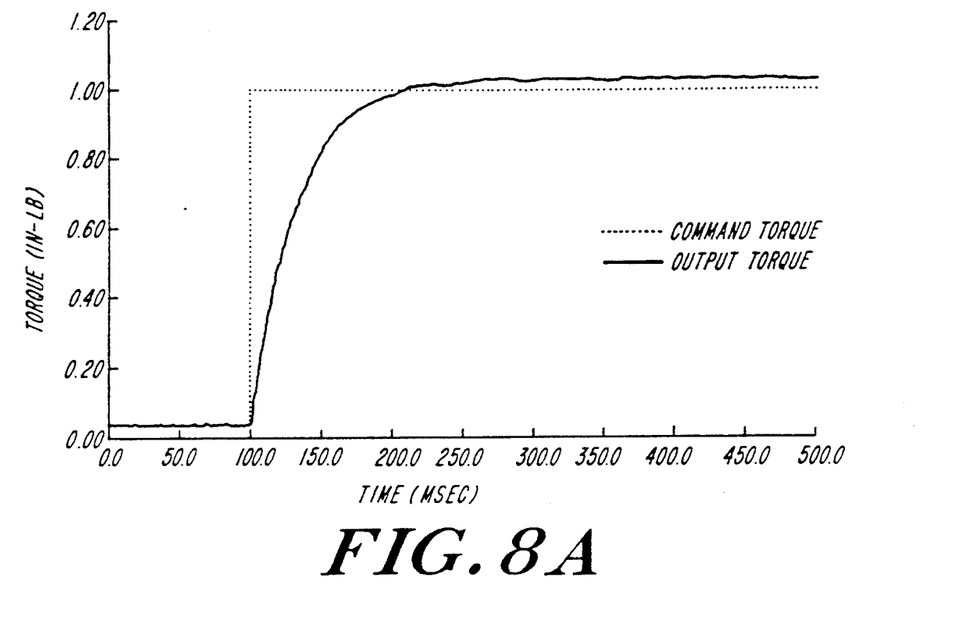
FIGS. 8A and 8B are graphs comparing the time response of an actual output torque of the actuator shown in FIGS. 1 and 2 to a torque command, with the open loop response shown in FIG. 8A and the closed loop response with a PID controller shown in FIG. 8B.
Figure 8B:
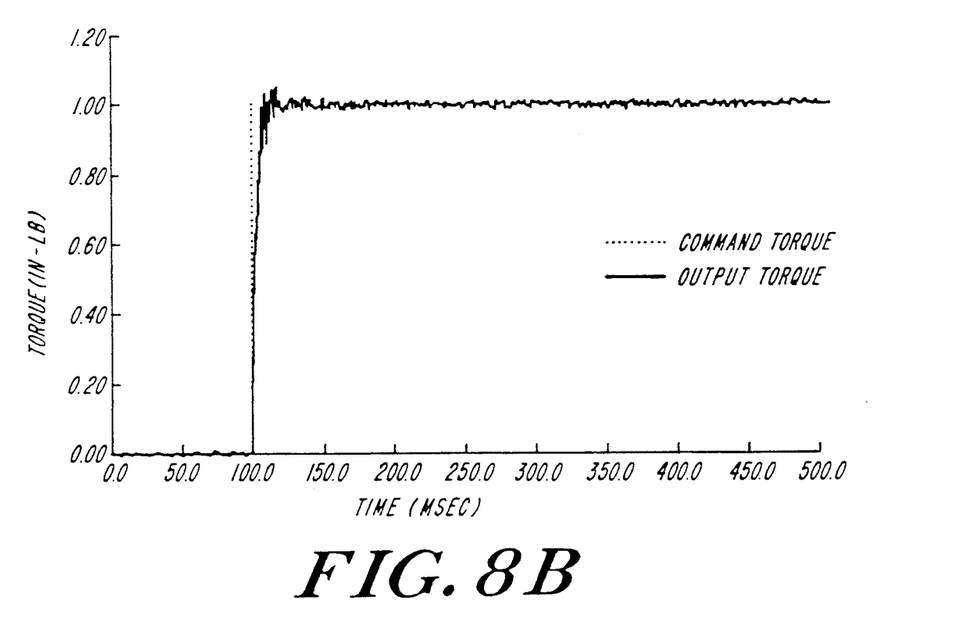

FIGS. 8A and 8B show the step response of an open loop system with and without PID controller compensation in response to a command to produce 1.0 in-lb of torque at time of t=100 milliseconds. The rise time of the overdamped response shown in FIG. 8A is about 105 msec approximately the expected value for a system with a pole between 7 and 9 Hz. The steady state error in this system is 0.035 in-lb. This low frequency pole is introduced by the current controller; it severely damps the open loop response. By adding a high gain PID controller, it is possible to speed up the rise time by a factor of 20 or more, as shown in FIG. 8B. For one set of gains, the system crossed the commanded torque in 5 msec and settled to within 5% in 11 msec. and 2% in 20 msec. These response times are consonant with bandwidths of 200 to 300 Hz. Open loop errors were found to be as large as 0.35 in-lb for a 5.0 in-lb command, or 7%. These errors are due primarily to torque ripple and offset caused by Coulomb friction in the bearings. Closed loop systems are capable of controlling torque accuracy within 0.01 in-lb over a torque range of ±15 in-lb, yielding an error of less than 0.1%. The dynamic range provided by the system utilizing the WAM and drive shown in FIGS. 3 and 4 and the reaction torque actuator of FIGS. 1 and 2 is therefore on the order of 1500 to 1, with the accuracy limited by the quantization noise of the sensor and drive electronics. As noted above, the sensor bandwidth was found to be as much as approximately 300 Hz, which is approximately three times larger than required for the WAM.

There has been described a torque actuator which provides an extremely accurate control over the output torque of a rotary output motor, particularly an electric motor and more particularly a brushless D.C. motor. The invention provides an unusually large bandwidth, up to 300 Hz, which provides a very fast response. The actuator performance is not limited by the frequency response of the transmission and is not degraded by frictions in the bearings and joints of the transmission and connections between the transmissions and the load. The actuator can be built in a lightweight, compact and cost effective form using standard off-the-shelf components (with the exception of the preferred controller which is modified as described above to reduce the noise generated by the electronic switching). The actuator is isolated from frictions and moments, both axial and radial produced by or applied to the motor. It also measures directly the output shaft torque of the motor and is colocated for direct and immediate feedback. The actuator is also readily mounted in any of a variety of ways to accommodate a wide range of applications.

While the invention has been described with respect to its preferred embodiments, it will be understood that various modifications and alterations will occur to those skilled in the art in the foregoing detailed description and accompanying drawings. For example, while the invention has been described with respect to a brushless D.C. motor, the concepts of the features of the present invention can be utilized in conjunction with any rotary actuator such as a conventional AC electric motor, or even a hydraulic or pneumatic rotary motor. However, there are performance tradeoffs as compared to the brushless D.C. motor for high accuracy, high bandwidth applications such as in a WAM. Further, it is possible to use a variety of sensors. Any transducer which can accurately and reliably translate small angular displacements into corresponding and proportional electric output signals is possible. Further, while high quality instrumentation bearings are described as mounting the motor housing within the outer housing, it may be possible to use flexure mounts to support the motor within the outer housing in a manner that isolates the sensor from axial and radial moments while allowing a mutual rotation of the motor housing with respect to the outer housing. Further, while the invention has been described with respect to a high performance torque actuator for use in a whole arm manipulator, it will be understood that this invention can be utilized in a wide variety of applications. For example, it can be used to sense and control the output torque of motors that drive numerically controlled machine tools. These and other variations and modifications are intended to fall within the scope of the appended claims.

What is claimed is:

1. A torque actuator for sensing the torque output of a motor having a rigid housing and an output shaft rotatable about a first axis, comprising
    an outer housing that surrounds the motor housing in a spaced relationship and is grounded,
    first and second support means mounted between said outer housing and said motor housing, said first and second support means being mutually spaced along the first axis and constructed and positioned to resist axial and radial moments while allowing only a mutual angular displacement of said motor housing and outer housing about said first axis in reaction to the actual output torque of said shaft, and
    sensor means operatively coupled between said motor housing and said grounded outer housing that converts said angular displacement caused by said reaction toque into a first electrical signal that corresponds to the output torque of the shaft, said sensor means having no moving parts and limiting said mutual angular displacement to a fraction of a degree.

2. The torque actuator of claim 1 wherein said outer housing substantially has a side wall and front and rear end walls that together enclose said motor housing also having a side wall and front and rear end walls.

3. The torque actuator of claim 2 wherein said outer housing seals its interior.

4. The torque actuator of claim 1 wherein said first and second support means each comprise a bearing.

5. The torque actuator of claim 4 wherein a first one of said bearings is rigidly secured between said shaft and said outer housing and the second of said bearings is rigidly secured between said motor housing and said outer housing.

6. The torque actuator of claim 2 wherein said sensor comprises a strain gauge sensor rigidly secured to the rear end wall of said outer housing and having an angularly movable input shaft rigidly secured to the rear end wall of said motor housing.

7. The torque actuator of claim 1 wherein said motor comprises a brushless D.C. motor.

8. The torque actuator of claim 1 wherein said motor is an electric motor and further comprising a current controller for said motor and means for producing a second electrical signal indicative of said angular position of said shaft, said controller receiving said first and second electrical signals and producing an output current to said motor that results in a pre-selected output torque.

9. The torque actuator according to claim 8 wherein said controller includes means for producing a pulse width modulated current with sine wave commutation.

* * * * *